(12) United States Patent
Gonzalez et al.

(10) Patent No.: US 10,592,660 B2
(45) Date of Patent: Mar. 17, 2020

(54) CAPABILITY ACCESS MANAGEMENT

(71) Applicant: Microsoft Technology Licensing, LLC, Redmond, WA (US)

(72) Inventors: Matthew Gonzalez, Kirkland, WA (US); John Sheehan, Seattle, WA (US); Peter Torr, Bellevue, WA (US); Yifan Wang, Bothell, WA (US); Benjamin McGregor, Redmond, WA (US); Kumar Rajeev, Redmond, WA (US); Dylan D'Silva, Redmond, WA (US); Peter Wieland, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 122 days.

(21) Appl. No.: 15/359,022

(22) Filed: Nov. 22, 2016

(65) Prior Publication Data
US 2018/0143915 A1    May 24, 2018

(51) Int. Cl.
*G06F 21/51*    (2013.01)
(52) U.S. Cl.
CPC .................... *G06F 21/51* (2013.01)
(58) Field of Classification Search
CPC ................ G06F 12/1483; G06F 21/51; G06F 2212/1052
See application file for complete search history.

(56) References Cited

U.S. PATENT DOCUMENTS

| 7,426,550 | B2 | 9/2008 | Abhishek et al. |
| 7,630,877 | B2 | 12/2009 | Brown et al. |
| 7,870,399 | B2 | 1/2011 | Bryant et al. |
| 7,913,092 | B1 | 3/2011 | Hiltunen et al. |
| 9,152,541 | B1 | 10/2015 | Kuo et al. |
| 9,294,284 | B1 | 3/2016 | Mao |
| 2005/0102510 | A1 | 5/2005 | Patrick et al. |
| 2005/0252963 | A1* | 11/2005 | Adams ............... G06F 12/1458 235/382 |
| 2011/0296370 | A1 | 12/2011 | Ferris et al. |
| 2013/0061281 | A1 | 3/2013 | Pao et al. |

(Continued)

FOREIGN PATENT DOCUMENTS

EP    2793160 A1    10/2014

OTHER PUBLICATIONS

"Incapsula: Web Application Firewall", Published on: Dec. 16, 2014, 5 pages. https://www.incapsula.com/website-security/web-application-firewall.html.

(Continued)

*Primary Examiner* — Nanci N Wong
(74) *Attorney, Agent, or Firm* — International IP Law Group, PLLC

(57) ABSTRACT

Various systems and methods for capability access management are disclosed herein. In one example, a system includes a memory and a processor to send a signed custom capability description (SCCD) received from a first vendor to the memory for storage. The system may send an application received from a second vendor to the memory for storage. The system attempts to match the application to an authorization listing of the SCCD, where the application can be modified to allow access to a previously inaccessible custom capability in response to the application matching the authorization listing of the SCCD.

18 Claims, 8 Drawing Sheets

(56) References Cited

U.S. PATENT DOCUMENTS

| | | | |
|---|---|---|---|
| 2014/0075188 A1 | 3/2014 | Yin et al. | |
| 2014/0283039 A1 | 9/2014 | Wang et al. | |
| 2015/0339482 A1* | 11/2015 | Wurster | G06F 21/62 |
| | | | 726/30 |
| 2016/0248746 A1* | 8/2016 | James | H04W 4/70 |
| 2016/0321452 A1* | 11/2016 | Richardson | G06F 21/50 |
| 2016/0350529 A1* | 12/2016 | Kerr | G06F 21/52 |
| 2019/0074982 A1* | 3/2019 | Hughes | H04L 9/3268 |

OTHER PUBLICATIONS

"Custom Security Policy and Authentication Providers", Published on: Mar. 3, 2015, 2 pages. http://docs.oracle.com/javame/8.1/sdk-dev-guide/custom_providers.htm.

Pavon, Pedro, "Third-Party Vendor Management Means Managing Your Own Risk", Published on: Jan. 27, 2015, 5 pages. https://iapp.org/news/a/third-party-vendor-management-means-managing-your-own-risk-chapter-five-the-cloud/.

McGraw, Gary, "Testing, assessment methods offer third-party software security assurance", Published on: Jan. 2013, 5 pages. http://searchsecurity.techtarget.com/opinion/Testing-assessment-methods-offer-third-party-software-security-assurance.

"Strategic Customer Engineer, Google Cloud Platform", Retrieved on: Jul. 26, 2016, 2 pages. https://www.google.com/about/careers/jobs#It=jo&jid=/google/strategic-customer-engineer-google-cloud-singapore-5410012.

"Microsoft: Security Policy Model", Retrieved on: Aug. 5, 2016, 1 page. https://msdn.microsoft.com/en-us/library/ck90k585(v=vs.90)aspx.

"Google: <permission>", Retrieved on: Aug. 5, 2016, 3 pages. https://developer.android.com/guide/topics/manifest/permission-element.html.

* cited by examiner

CAPABILITY ACCESS MANAGEMENT

BACKGROUND

Operating systems protect sensitive resources such that authorized entities are allowed the appropriate level of access. If the OS has prior knowledge of these resources and entities, a policy of access can be packaged as part of the OS. An ecosystem of software and hardware development can include original equipment manufacturers (OEMs), independent hardware vendors (IHVs), independent software vendors (ISVs), independent distribution channels such as stores, and other developers of hardware and software. Development entities can have their own resources and their own set of authorized entities that may not be packaged with an operating system, and accordingly, an OS attempting to determine access to a resource by an entity may not be able to make the right policy decisions.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment provides a system that includes a memory and a processor to send a signed custom capability description (SCCD) received from a first vendor to the memory for storage. The system may send an application received from a second vendor to the memory for storage. In an example, the system can attempt to match the application to an authorization listing of the SCCD. In an example, at least one of the application and/or the application state is modified to allow access to a previously inaccessible custom capability in response to the application matching the authorization listing of the SCCD.

An embodiment provides a method for capability access management that includes sending a signed custom capability description (SCCD) received from a first vendor to a memory for storage. The embodiment can include sending an application received from a second vendor to the memory for storage. In an example, the method attempts to match the application to an authorization listing of the SCCD. In an example, the at least one of the application and/or the application state is modified to allow access to a previously inaccessible custom capability in response to the application matching the authorization listing of the SCCD.

Another embodiment provides a tangible, computer-readable medium comprising instructions that, when executed by a processor, send a signed custom capability description (SCCD) received from a first vendor to a memory for storage. In an example, the instructions, when executed by a processor send an application received from a second vendor to the memory. In an example, the instructions executed on the processor can attempt to match the application to an authorization listing of the SCCD. In this embodiment, at least one of the application and/or the application state is modified to allow access to a previously inaccessible custom capability in response to the application matching the authorization listing of the SCCD.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
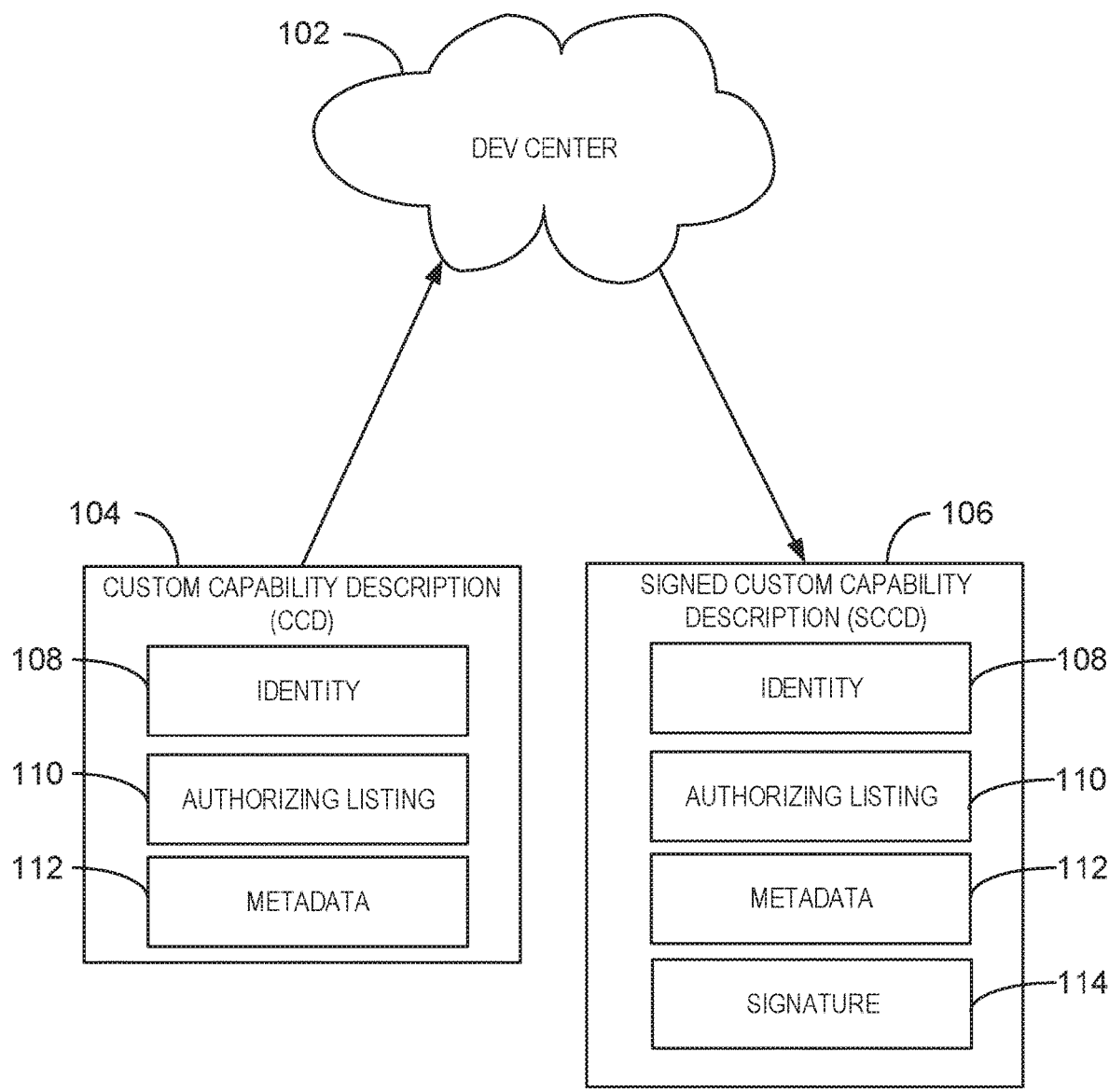
FIG. 1 shows a schematic diagram for generation of a SCCD based on the submission of a CCD to a development center.

In general, capabilities are defined and controlled by the operating system owner. The present application shows a model allowing third parties to define capabilities and then control access to those capabilities without insertion of that third party code into the actual operating system code itself. The present disclosure presents techniques for an operating system builder to delegate capability authorization to the third parties themselves.

Some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discrete logic components, such as application specific integrated circuits (ASICs), and the like, as well as any combinations thereof.

The term "logic" encompasses any functionality for performing a task. For instance, each operation illustrated in the flowcharts corresponds to logic for performing that operation. An operation can be performed using software, hardware, firmware, physical electronic circuits, and the like, or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). Computer-readable storage media does not include all implementations of computer-readable media generally, such as signals per se. Therefore, in contrast, computer-readable media generally (i.e., not computer-readable storage media) may additionally include communication media such as transmission media for wireless signals and the like.

Hardware or software used in a system, or by a system can be developed separately from a system by an independent hardware or software vendor. The hardware or software developed can have specific properties, characteristics, functions, and software—referred to generally as custom capabilities. A hardware or software developer and an operating system may wish to manage access to these custom capabilities. As used herein, any reference to accessing the custom capabilities refers to indirect accessing of the hardware or software. For example, a device access in the operating system can go through the operating system. In an example, an access can be through system software such as device drivers, which can themselves be either first-party or third-party device drivers. In another example, the device access in the operating system can go through system services whether they are first-party or third-party system services as well as dynamic link libraries (DLLs).

Software can define the capabilities that an application may access. The application uses the capabilities by going through the software. The software may be controlling hardware, or it could be a shared software resource (like a database) or a bridge to a cloud service. The present disclosure shows a number of techniques for managing access to custom capabilities.

Previously, techniques to address capability management either have not provided a centralized method for deployment of software and hardware capabilities or could not manage and control deployment of custom capabilities to $3^{rd}$ parties. In the present disclosure, an independent hardware vendor (IHV), for example, can manage access to their sensitive resources by disallowing access to those without authorization to use a signed custom capability description (SCCD). As used herein, any reference to an IHV could also refer to an independent software vendor depending on the technology being developed and sold. A SCCD can include a description of the custom capability including a name, an authorization listing of those allowed to use it and other metadata about the capability. The SCCD is related to the custom capability description (CCD) which is an unsigned description of the capability.

Verification of authorization to use an SCCD can include an application program interface call to verify that the entity requesting use of the capability has a matching description of the capability. While the present technique shows one way authorization to access a custom capability, the present technique also allows IHVs to use other authorization mechanisms such as two-way authorization where application is allowed to make sure that the capability provider is who it claims to be. As described below, the present technique allows $3^{rd}$ parties such as IHVs or independent software vendors (ISVs) to define their own restrictions to the access of a capability and have these restrictions authorized and processed by a central deployment sources, such as a webstore, an application store, or other type of database of software. As used herein, the authorization and processing can be accomplished by a number of methods. One method for authorization and processing is through an automated process. In the automated process, if the capability owner is using a trusted development center, and the ISVs using it have accounts with the trusted development center, then the owner can provide a list of trusted users of the capability to trusted development center. The trusted development center can store the list of trusted users in a database. In the automated process, the trusted development center can produce SCCDs on-demand for authorized parties. These could come via B2B calls from third-party stores, if necessary, provided those stores had credentials to prove they were acting on behalf of the ISV.

Another method for authorization and processing is through a manual process. In the manual process, a capability owner can submit identification information to the development center and development center can blindly sign the SCCD without knowledge of who the entity is that is being authorized. The identification information could be an application name and/or a signing certificate, depending on the owner's preference. In an example, the target ISV may avoid making or maintaining an account with the development center, but the owner would need to be registered with the development center.

Another method can include hybrid models where the requests can still go through a central development center. While previous systems may have had an owner providing a list up-front that gets stored in a database, the central development center disclosed herein can use a workflow to dynamically query the capability owner via e-mail, phone call, B2B web-service calls, to see if they want to allow an ISV to have access.

The present disclosure can allow a developer of hardware or software to gate access to their software, so they can have control over what applications can interact with their hardware or software endpoints. In an example, when a developer of a capability registers the capability with a trusted development center, the developer can also provide a list of parties, types of entities, or specific entities that may or may not use or access the capability. In another example, the application to use the capability may not be from the application store, but sideloaded, such as through in-person deployment, or any other deployment that does not involve a networked application store. In an example of sideloading an application, an information technology (IT) manager can deploy an application with a hardware-specific capability enabled through a local system rather than through the store. In an example, the application can be sideloaded from a networked application store. As used herein, sideloaded can refer to an origin coming from entity not presently recognized by the operating system to authorize application deployment. As described herein and in the examples below, the SCCD prevents someone from side-loading an application that can gain access to unauthorized capabilities.

FIG. 1 shows a schematic diagram for generation 100 of a SCCD based on the submission of a CCD to a development center 102. The development center 102 can be an online store for applications, memory, a server, application storage, or any system that can centrally manage software and access to a capability. As used herein, the development center 102 is trusted by the operating system vendor to limit the signing of SCCDs to requests that have gone through an appropriate vetting process including verifying that the request comes from an owner of the SCCD with strong authentication. FIG. 1 shows the submission of a CCD 104 to be converted and output as an SCCD 106 from the development center 102.

The technique for generation of an SCCD shown in FIG. 1 can be used by an IHV defining a capability, but may also be done by ISVs or anyone else with a development center account. This allows the developing entity, such as the IHV or the ISV to declare the capability that they wish to claim and define any authorized users of that capability through the use of the CCD 104.

In an example, the signature can be the sole factor in determining authorization as the application can claim the capability as authorized when it is signed with a certificate matching, or rolling up to the public key in the SCCD. This is not to be confused with an access management functionality provided by development center example where it is identified who can get an SCCD for a given capability. In another example provided the development center can grant access to capabilities that have been authorized to individual users, companies, groups, and other similar entities by the owner of the capability. In an example, the CCD 104 can include an identity 108 such as the name of the capability or capabilities, an authorization listing 110, or any other metadata 112 related to the custom capability. The metadata 112 can include information such as date a custom capability was created, its storage size, the last date it was modified, who authored the custom capability, and other similar information. The authorization listing can include a listing of developers, vendors, users, types of users, types of devices, or any other subgroup to whom a CCD developer wishes to deploy an SCCD. The authorization listing can include whether the SCCD is applicable to broad distribution to retail consumers, or limited to computers that are designated as development and testing machines. In one example, the IHV could create the CCD, including the identity 108 that can be a name that has not been used before, and optionally an authorization listing 110 which can include a set of initially authorized entities (IAEs) who can use the capability.

In one example, the authorization listing 110 can include a package family name (PFN), user account listings, and public keys. As used herein, a PFN can be an identifier for the package, as understood by the operating system. A user account listing can refer to a listing or indication that any user with access to the development center, such as through user registration at the development center, would be included in the user account listing. As used herein, a development center can refer to an authority trusted by the OS to grant capability requests.

The CCD 104 can be sent to the development center 102 to be converted and output as a SCCD 106. In the present technique, anyone or any entity that had a registered developer account or a certain level of access to the development center 102 would be able to submit CCDs to the development center 102. In some cases, the CCD could be a separate file that is sent to the development center 102 by an entity, however, the CCD could also be submitted through a web based form that is filled in and submitted to the development center 102. In an example, the IHV can submit the CCD to the development center 102 which signs the CCD creating a SCCD. The development center 102 returns a SCCD if it determines that a submitter of a CCD, such as an IHV, has registered with the development center 102, and that the identity 108 of the capability described in the CCD 104 has not previously been used. The development center can verify that a CCD 104 includes a name that has not previously been used by comparing the submitted identity 108 to previously submitted CCDs from other entities. In response to the development center determining that the CCD name has not been used before, the development center can output a SCCD 106.

The identity 108 can be returned as part of the SCCD 106. As seen in the FIG. 1, the SCCD 106 inclusion of the identity 108 of the custom capability or capabilities are the custom capabilities that were authorized at the development center 102. In an alternative example not shown in the figure, the SCCD could also include a signed identity that would include a security identification (SID) derived from the identify of the CCD. In this alternative example, the signed identity could be in a normalized format used by the development center. In yet another alternative example, the identity in the SCCD might be different than the original identity in the CCD.

The development center 102 also returns the SCCD 106 with a signature 114 that can be used to confirm that the SCCD 106 has been generated by the development center 102. The contents of the SCCD 106 prevent unauthorized use as the signature can identify to the operating system that the SCCD 106 is authentic. In an example, the signature contains the public key for the application developer's codesigning certificate in plaintext in the file. If the public key is changed, or the file modified in any way the SCCD 106 may not be accepted.

Figure 2:
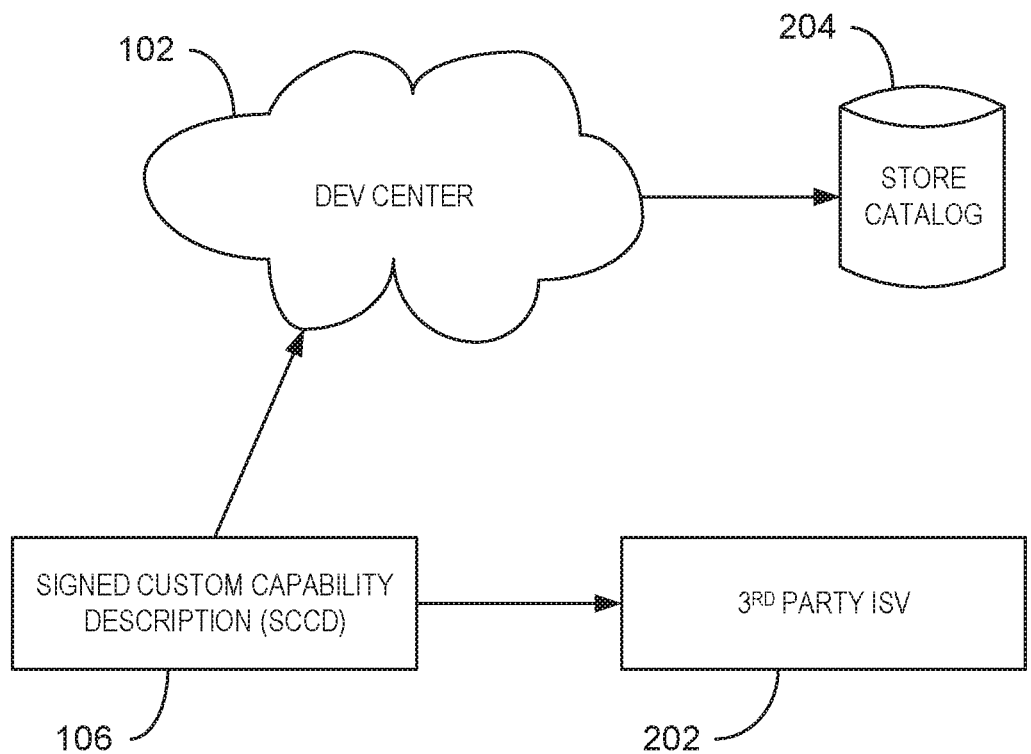
FIG. 2 shows a schematic diagram for a distribution of an SCCD to a third party independent software vendor and a development center.

FIG. 2 shows a schematic diagram for a distribution 200 of an SCCD 106 to a third party independent software vendor and a development center 102. Like numbered items are as described with respect to FIG. 1.

If an entity, such as an IHV, wants to allow broad distribution of authorization for a custom capability for hardware, they may use the development center 102 and other distribution techniques to spread the authorization broadly or narrowly.

In an example of distribution of authorization for verification, the SCCD 106 can be sent directly to a $3^{rd}$ party ISV 202. In an example, the $3^{rd}$ party ISV 202 may be writing software that makes use of the custom capability for hardware described in the SCCD 106. In an example, rather than sending the SCCD 106 to the $3^{rd}$ party ISV 202 directly, the SCCD 106 may be published as part of custom software development kit (SDK). Once the $3^{rd}$ party developer has the SCCD 106, it can be used for identifying to an operating system that the ISV with the SCCD 106 can have access to the capability the SCCD 106 describes.

The SCCD 106 can also be sent to the development center 102. In an example, this sending the SCCD 106 can be paired with the generation 100 of the SCCD shown in FIG. 1.

As discussed above, the SCCD 106 can include an authorization listing 110 which can include an indication authorizing broad-distribution authorized entities (BDAEs) such as entities requesting access from the store catalog 204 rather than through a direct sending or a published SDK. As discussed above, SCCD authorization can be determined by the certificate rather than by authorized users. Access to an SCCD for a given capability can be gated by an authorization listing of users, groups, and other suitable entities. In an example, when an SCCD 106 has been submitted to the development center 102, the development center 102 can send the SCCD 106 to a development center where the authorization listing 110 of the SCCD 106 can be added to the development center. Once the SCCD 106 and authorization listing 110 is stored in the development center, ISVs can submit their own applications to the development center 102 and request use of the custom capability.

Figure 3:
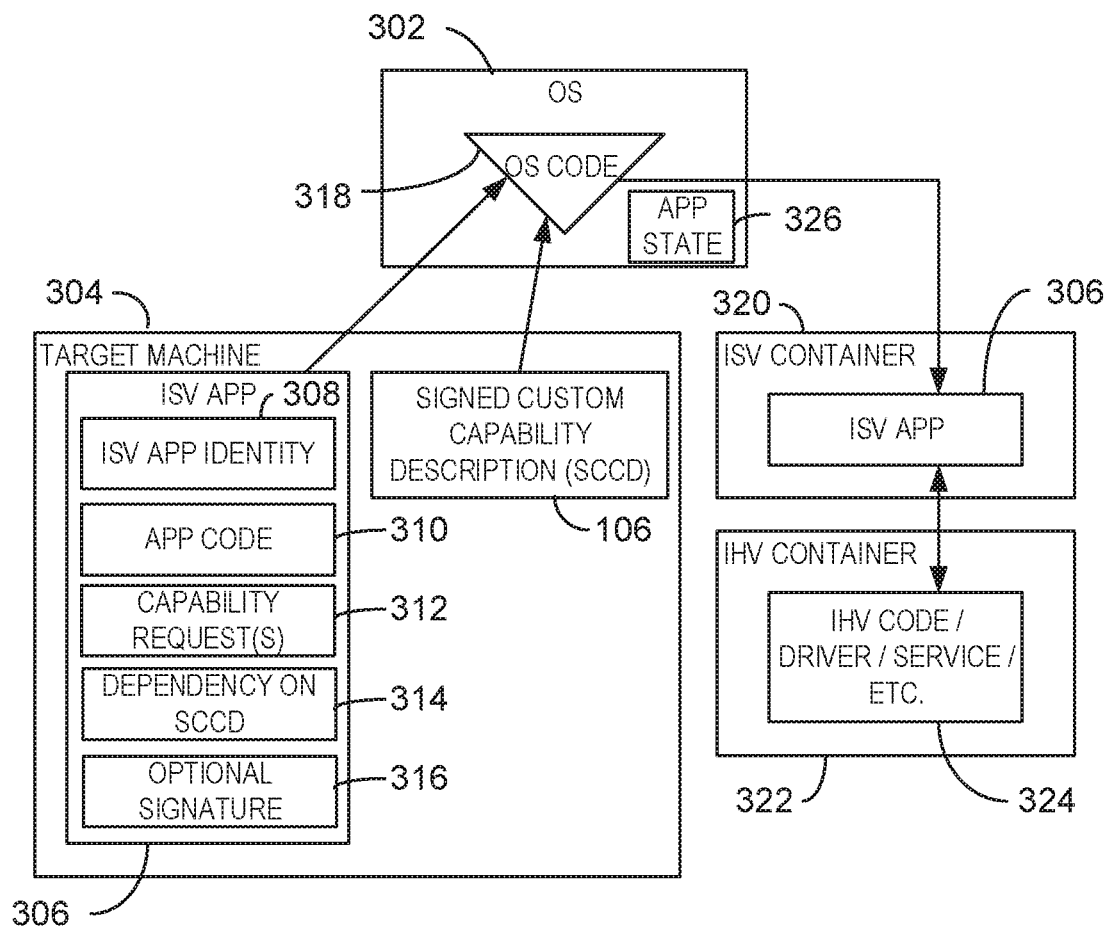
FIG. 3 shows a schematic diagram for a target machine submitting an application and SCCD with the result that the application can access a custom capability.

FIG. 3 shows a schematic diagram for a target machine submitting 300 an application and SCCD 106 with the result that the application can access a custom capability. Like numbered items are as described with regard to FIG. 1.

Developers such as ISVs may wish to test or add to their own software that makes use of a capability with limited distribution. In an example, an IT professional who is deploying a custom built application that uses a custom capability may wish to deploy the custom capability without the use of an online store, and thus will need to verify with an SCCD 106 locally for a target device.

Even if a target device has downloaded the capability, an operating system 302 (OS) may not grant an application in a target machine 304 access and manipulate the custom capability of the hardware even if the target machine has downloaded the capability or the hardware. To get access to the custom capability, and to be able to write software that can access the capability, the ISV can send the ISV application 306 and the SCCD 106 to the OS 302. As discussed above with regards to FIG. 2, the developer may be able to obtain the SCCD 106 directly or from a published SDK. As used herein, the ISV application 306 can include an ISV application identity 308 that can be a PFN, a registered account, a public key corresponding with the signature of the app, or other suitable application identity representations. The ISV application 306 also includes the executable code for the application 310 and the capability requests 312. The capability requests include calls in executable code of the application 310 that reference, request, or use aspects of the hardware custom capability. The ISV application 206 can also include a reference to its dependency 314 on the SCCD 106, which can include an invocation or reference to the SCCD that includes the signed capability description of the capability requests 312 of the ISV application 306. The ISV application 306 can also include an optional signature 316 that can correspond to the signature in the SCCD 106 to provide additional verification of the application's authorization to access the custom capability particularly with sensitive custom capabilities. In an example, the optional signature 316 can also serve as a substitute for the SCCD 106 for verification to the operating system that the application can access the custom capability. For example, if the OS determines that the application originates from a trusted distribution source, like the trusted development center and with an appropriate signature, then the SCCD is optional and can be ignored. In this example, the SCCD itself may not be used to verify an authorization if the operating system trusts the distributing authority to have already verified authorization of the application to use the custom capability Depending on the sensitivity of the capability resource being protected and the mechanism used to identify IAEs in the SCCD 106, the SCCD 106 may be treated as a secret and would not be shared with untrusted entities. If the capability were low sensitivity, it may be acceptable to share the SCCD 106 freely with a larger developer community through a published SDK.

When the ISV application 306 and SCCD 106 are sent to the OS 302, the OS code 318, may execute on a processor to determine the ISV application 306 may access the custom capability. The OS code 318 can verify that the dependency 314 on the SCCD includes or references the submitted SCCD 106. The OS code 318 can also verify that the application is distributed by an entity that the OS trusts to have already authorized use of the SCCD. The OS code 318 can verify that either the set of IAEs identified in the authorization listing 110 of the SCCD 106 is either broad enough to include the ISV application 306 or the authorization listing 110 identifies the ISV application 306 making the request. In an example, this identification can include matching the signature of the SCCD 106 and the optional signature of the ISV application 306. As this request is made by an application on a target machine 304 to an operating system 302, this process may be taking place in the same logical system. In this example, the verification may happen at the time the ISV application 306 is initially deployed to the application on the target machine 304. The verification may happen at the time the application is installed, executed, or immediately before a request to the protected custom capability for a hardware resource is made Once the ISV application 306 has been verified, this OS 302 can then execute the ISV application 306 with the granted custom capability. During execution the ISV application 306 may execute from an ISV container 320. As used herein, a container, such as the ISV container 320, is data structure whose instances are collections of other objects. A container, like the ISV container 320, can store objects in an organized way that follows specific access rules, such as the ability to access or not access a capability. In an example, the ISV container can be physically local to the application on the target machine 304, the hardware resource, or may be remote from both. While executing, if the ISV application 306 has been verified, the capability requests 312 executed in the ISV container 320 can be passed to an IHV container 322 and serviced by the IHV code 324. The IHV code 324 can be executable code to perform privileged actions on behalf of the original caller assuming the original caller possess the right to use the custom capability. In an example, the privileged code might use other mechanisms in addition to, or instead of, the custom capability. Further, the authentication and authorization mechanisms that might be used may not be mutually-exclusive. In an example, the requests 312 executed in the ISV container 320 can be passed to any other container or any non-container part of the operating system such as a driver, service, and a kernel function.

In an alternative embodiment, the operating system 302 can extract an ISV application state 326 from the ISV application 308. The extraction of the ISV application state 326 can be used in instances including the failing of the installation of the app, or the modifying of the application state recorded in an application state repository. These alternative instances can occur either by omitting custom capability claims that aren't backed by an SCCD, or by adding a property to the recorded capability claims that they aren't backed by an SCCD, or by recording the capability claims and the SCCD association and checking for such association at runtime when the app attempts to use the capability. The application state 326 may not or may not be recorded and stored. When the application state 326 is recorded and stored it can be stored outside the ISV container 320 and cannot be modified from within the ISV container 320. Further, in an example, the application state 326 and the ISV container can be combined to become an entity modified during installation.

Figure 4:
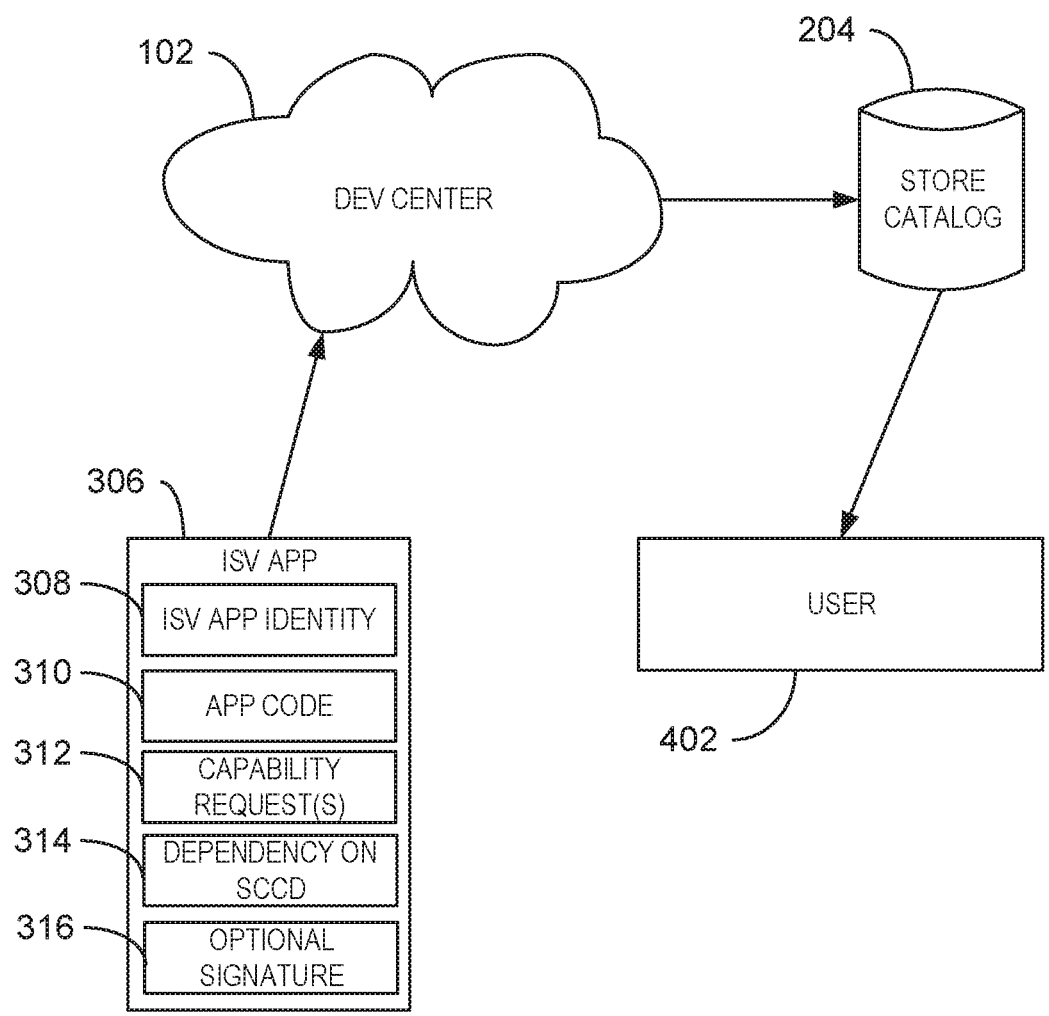
FIG. 4 shows a schematic diagram for an application submission to a development center and store catalog for downloading and use by a user.

FIG. 4 shows a schematic diagram for an application submission to a development center and store catalog for downloading 400 and use by a user 402. Like numbered items are as described with reference to FIGS. 1, 2, and 3.

If an ISV application 306 is to enable a user 402 to access the custom capabilities, the deployment of the ISV application 306 may not always be direct. In some cases, the user 402 may download their applications from a central source, such as the store catalog 204. As used herein, the store catalog can be any distribution mechanism, including just a website or e-mailed files each of which may not be a trusted source by an operating system. The ISV application 306 can be submitted for signing at the development center 102. The ISV application 306 can then be submitted by the development center 102 for storage for downloading by a user 402 at the store catalog 204 as a signed ISV application 306. In this implementation, the OS can assume that proper access checks have been completed by the development center, and authorized apps are signed by the store.

In the case where an application is signed by the developer and not by a store or trusted distribution center, authorization hinges on the SCCD containing the public key of the codesigning certificate used to sign the app or the certificate that rolls up to the same root. If the certificate is not listed in the SCCD, the application is not installed. The signature is one way of several that can assist in it could be the PFN or something else used to identify the app (or a set of apps). In an example, to add an additional certificate, a new SCCD can be issued. For example, one alternate approach includes installing the application without the capability being granted so that the application can still run, but doesn't get privileged access to things.

When the ISV application 306 is submitted to the development center 102, the development center 102 can check the ISV application 306 to determine if the ISV application 306 requests any custom capabilities requiring verification. If the application does have custom capability requests 312, then the development center verifies if the ISV application 306 can access the custom capabilities of the hardware source. As described above, this verification can be done through the use of an optional signature 316 in the ISV application. Verification can also take place through submission with the corresponding SCCD 106 and matching of the dependency 314 listed in the ISV application 306 to the submitted SCCD 106. The verification can also take place by comparison of the ISV application identity 308 to the authorization listing 110 of an SCCD 106 previously submitted to the development center 102 as seen, for example in FIG. 2. As discussed above, some SCCDs 106 can allow ISV applications 306 to have access to the custom capability without restriction so long as the ISV application 306 has been submitted by a registered user of the development center 102. In an example the matching verification can come through the ISV application's 306 listing as coming from a broad-distribution authorized entity (BDAE). In an alternate implementation, rather than the development center 102 having a set of BDAEs provided by a hardware developer or custom capability developer, the development center 102 could grant access to every application that has capability requests 312 to their custom capability, while retaining the right to revoke or modify this approval at a later time.

Once the ISV application is verified at the development center 102, the application can then be sent to the store catalog 204 as an ISV application 306 authorized to access the custom capability of the hardware resource. The store catalog 204 can deploy and distribute broadly the ISV application 306 to devices upon request by the user 402.

Figure 5:
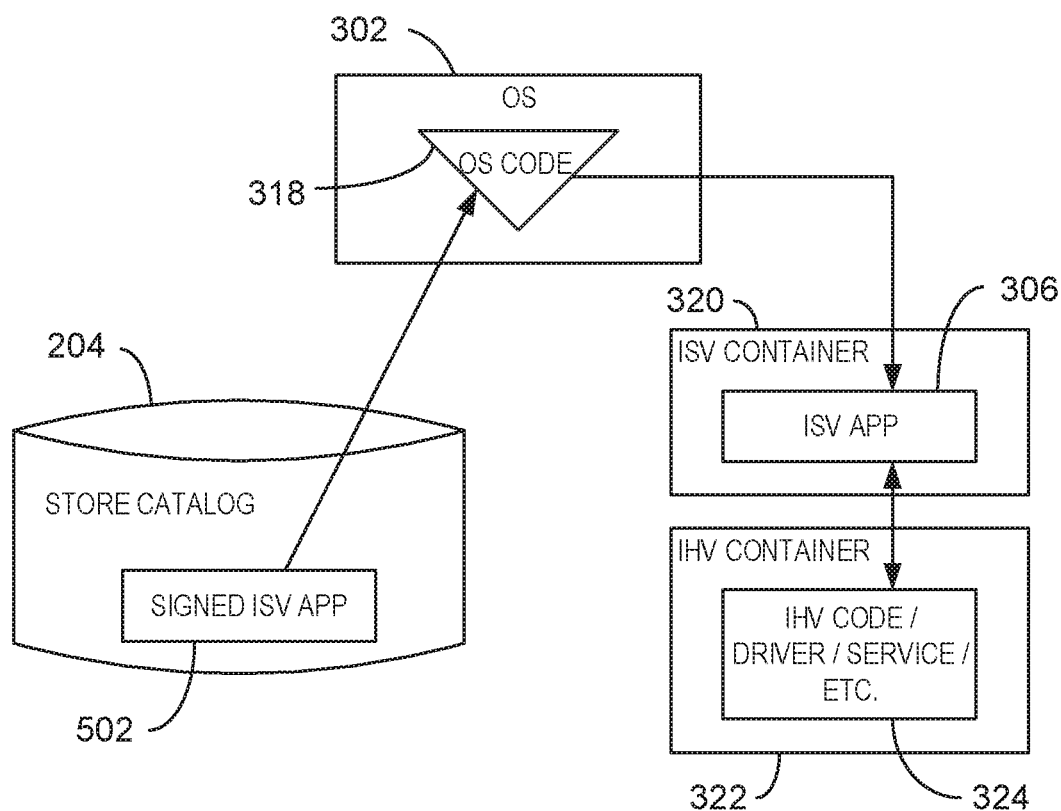
FIG. 5 shows a schematic diagram of an operating system downloading a signed application and deploying it to access a custom capability.

FIG. 5 shows a schematic diagram of an operating system downloading 500 a signed ISV application 502 and deploying it to access a custom capability. Like numbered items are as described with respect to FIGS. 2 and 3.

As used herein, a signed ISV application 502 can include an ISV application 306 that has been verified and stored as described with reference to FIG. 4. In another model, when a user 402 acquires a signed ISV application 502 from a distribution source such as the store catalog 204, the OS code 318 can check the signed ISV application 502 to determine if the signed ISV application 502 has capability requests 312. In another model, if capability requests 312 are present in the signed ISV application 502, the OS code 318 can verify if the signed ISV application 502 has been authorized to access the custom capability. In some examples, an SCCD is not needed in an application from a trusted distribution source because the OS trusts the distribution source to have done the authorization already.

Figure 6:
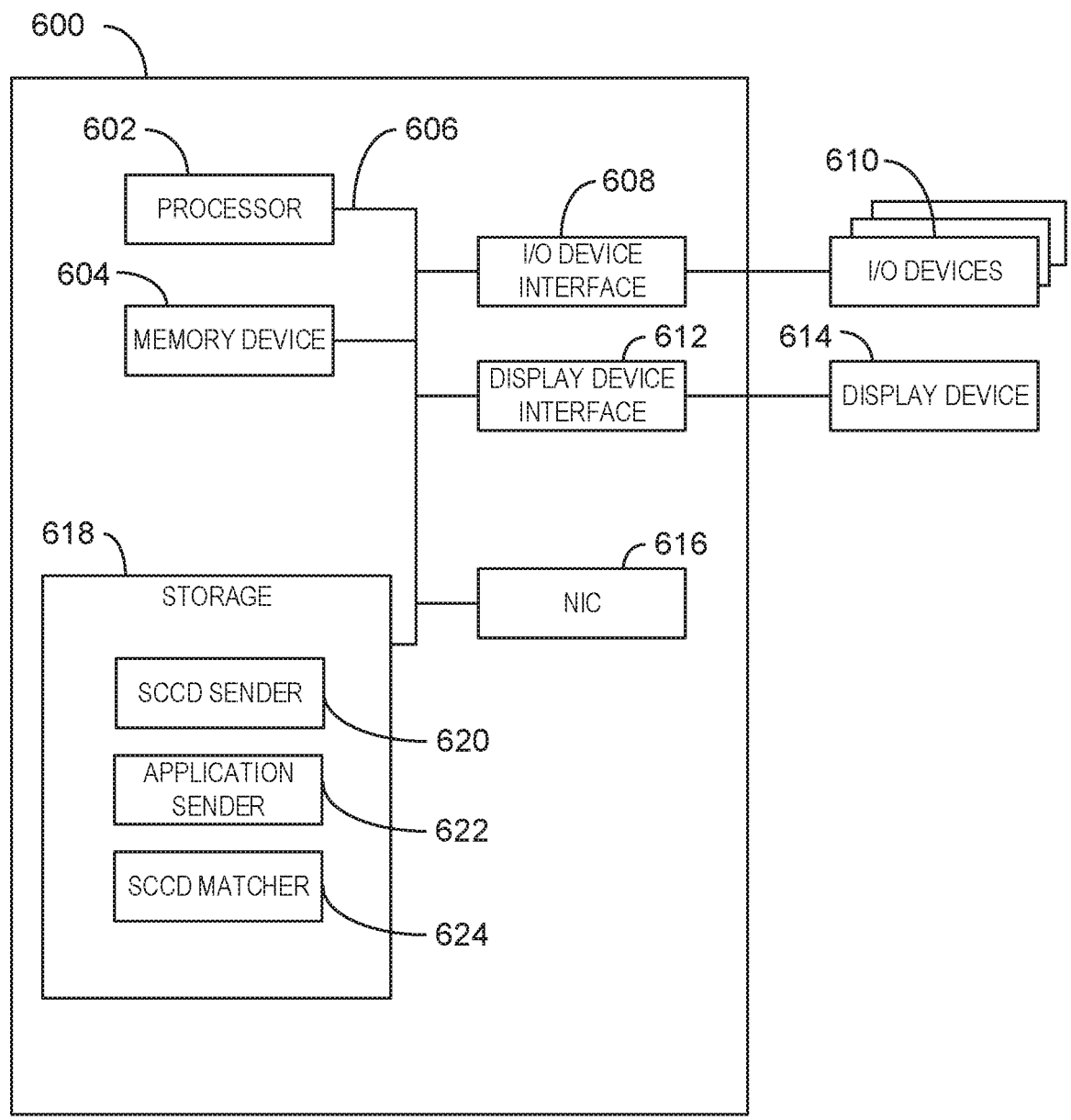
FIG. 6 is a block diagram of an example of a computing system for capability access management.

In an example, an OS code can ignore checking for a locally-deployed SCCD 106 or check a set of IAEs or BDAEs in an offsite authorization listing 110. In some examples, verification is handled entirely at the development center 102. FIG. 6 is a block diagram of an example of a computing system for capability access management. The computing system 600 may be, for example, a mobile phone, laptop computer, desktop computer, or tablet computer, among others. The computing system 600 may include a processor 602 that is adapted to execute stored instructions, as well as a memory device 604 that stores instructions that are executable by the processor 602. The processor 602 can be a single core processor, a multi-core processor, a computing cluster, or any number of other configurations. The memory device 604 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems.

The processor 602 may be connected through a system bus 606 (e.g., PCI, ISA, PCI-Express, NuBus, etc.) to an input/output (I/O) device interface 608 adapted to connect the computing system 600 to one or more I/O devices 610. The I/O devices 610 may include, for example, a keyboard, a gesture recognition input device, a voice recognition device, and a pointing device, wherein the pointing device may include a touchpad or a touchscreen, among others. The I/O devices 610 may be built-in components of the computing system 600, or may be devices that are externally connected to the computing system 600.

The processor 602 may also be linked through the system bus 606 to a display device interface 612 adapted to connect the computing system 600 to a display device 614. The display device 614 may include a display screen that is a built-in component of the computing system 600. The display device 614 may also include a computer monitor, television, or projector, among others, that is externally connected to the computing system 600. A network interface card (NIC) 616 may also be adapted to connect the computing system 600 through the system bus 606 to a network (not depicted).

The storage 618 can include a hard drive, an optical drive, a USB flash drive, an array of drives, cloud storage, network area storage, or any other suitable storing means or combinations thereof. The storage 618 may include a SCCD sender 620, an application sender 622, and an SCCD matcher 624. The SCCD sender 620 can send a signed custom capability description (SCCD) received from a first vendor to a memory device 604 for storage. In an alternative example, the processor 602 can generate the SCCD in response to a custom capability description (CCD) received by the processor 602.

The application sender 622 can send an application received from a second vendor to the memory device 604 for storage in the memory device 604 in response to the application matching to an authorization listing of the SCCD. In an example, the application can be stored in the memory device 604 in response to provisioning by the second vendor of a copy of the SCCD.

The SCCD matcher 624 can attempt to match the application to an authorization listing of the SCCD, and if a match is successful, the application can be modified to allow access to a previously inaccessible custom capability. In an example, the application might simply fail to install. In another example, an application could be checked to see if it matches a recorded authorization in the SCCD, and then check that data when the application attempts to use the capability it was, or was not, authorized to use.

In an example, the attempt to match the authorization listing of the SCCD occurs in a user device during an installation of the application.

It is to be understood that the block diagram of FIG. 6 is not intended to indicate that the computing system 600 is to include all of the components shown in FIG. 6. Rather, the computing system 600 can include fewer or additional components not illustrated in FIG. 6 (e.g., additional applications, additional modules, additional memory devices, additional network interfaces, etc.).

Figure 7:
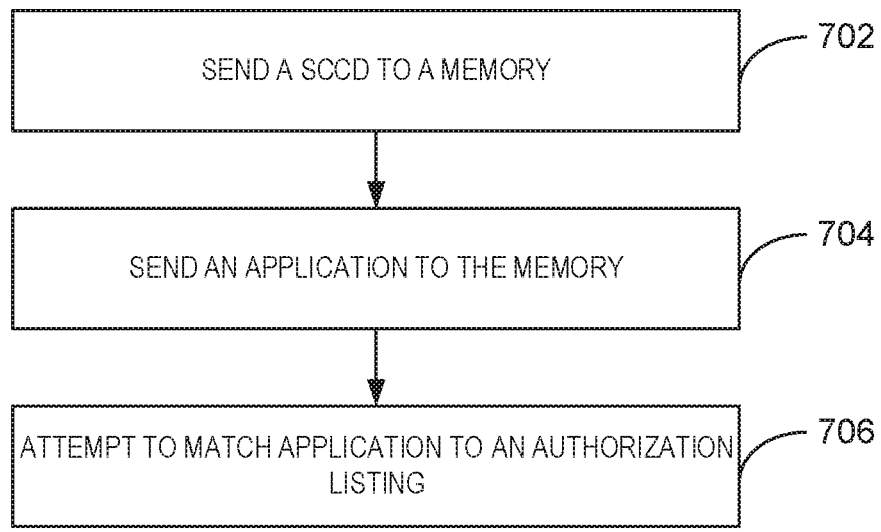
FIG. 7 is a process flow diagram of an example process for capability access management.

FIG. 7 is a process flow diagram of an example method 700 for capability access management. The elements of the method shown here are presented in an example order, however, other orders of this method can also function, for example, switching order of blocks 702 and 704. The method 700 can be implemented with any suitable computing device, such as the computing system 600 of FIG. 6.

At block 702, the method 700 includes sending an SCCD to a memory. In an example, the SCCD 106 is received from a first vendor. In an example, a processor 602 can generate the SCCD 106 in response to a custom capability description (CCD) received by the processor 602.

At block 704, the method 700 includes sending an application received from a second vendor to the memory for storage in response to the application requesting a custom capability. The application can then be loaded, with or without the SCCD, and it can be determined if the application request is authorized. The authorization can involve matching the application request to an authorization listing of the SCCD 106. In an example, the application can be stored in the memory in response to a provision by the second vendor of a copy of the SCCD 106.

At block 706, the method 700 may attempt to match the application to an authorization listing 110 of the SCCD 106, and if a match is successful, the application can be modified to allow access to a previously inaccessible custom capability. In an example, the attempt to match the authorization listing of the SCCD 106 occurs in user device during an installation of the application.

Figure 8:
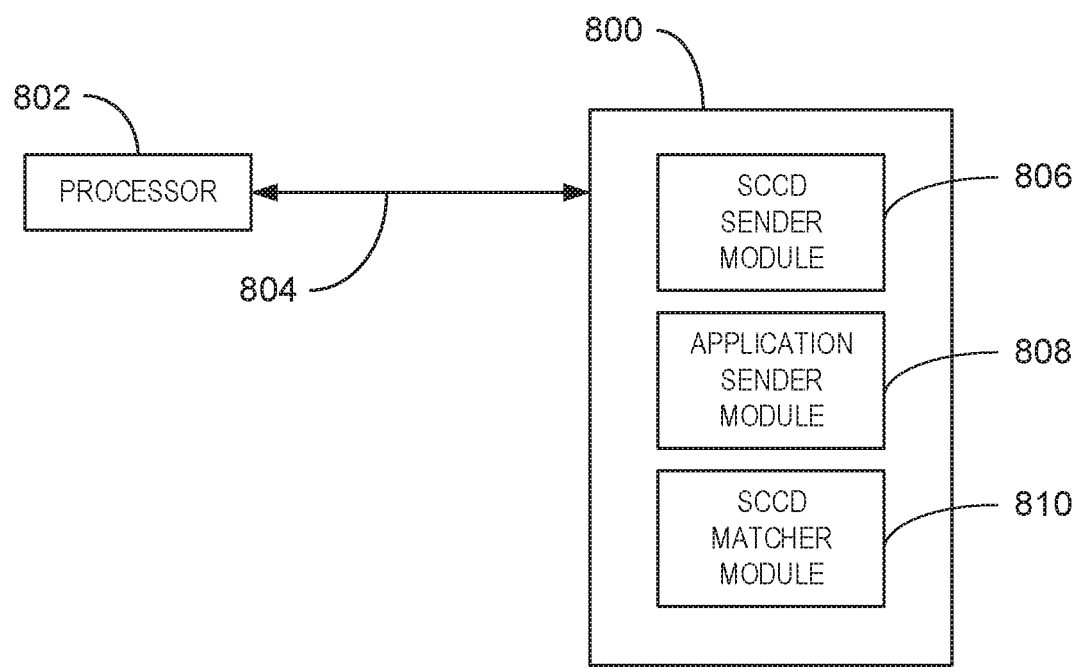
FIG. 8 is block diagram of an example computer-readable storage media for capability access management.

FIG. 8 is block diagram of an example computer-readable storage media for capability access management. The tangible, computer-readable storage media 800 may be accessed by a processor 802 over a computer bus 804. Furthermore, the tangible, computer-readable storage media 800 may include code to direct the processor 802 to perform the steps of method 700.

The various software components discussed herein may be stored on the tangible, computer-readable storage media 800, as indicated in FIG. 8. For example, the tangible computer-readable storage media 800 can include a SCCD sender module 806 to send an SCCD 106 from a first vendor to a memory. The tangible computer-readable storage media 800 can include an application sender module 808 to send an application from a second vendor to a memory. The tangible computer-readable storage media 800 may also include a SCCD matcher module 810 to attempt to match the application to an authorization listing 110 of the SCCD 106, and if a match is successful, the application can be modified to allow access to a previously inaccessible custom capability.

It is to be understood that any number of additional software components not shown in FIG. 8 may be included within the tangible, computer-readable storage media 800, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

EXAMPLES

Example 1

Example 1 is a system for capability access management. The example system for capability access management includes a memory and a processor to send a signed custom capability description (SCCD) received from a first vendor to the memory for storage and to send an application received from a second vendor to the memory for storage in the memory in response to the application asking for the capability. The application can then be loaded, with or without the SCCD, and it can be determined if the application request is authorized the matching to an authorization listing of the SCCD. The system of Example 1 also includes, wherein the application can be modified to allow access to a previously inaccessible custom capability in response to the application matching the authorization listing of the SCCD.

Example 2

Example 2 includes the capability management system of Example 1, including or excluding optional features. In this example, the custom capability is accessible by the application in response to installation of the application on the user device subsequent to the application matching the authorization listing of the SCCD.

Example 3

Example 3 includes the capability management system of Example 1, including or excluding optional features. In this example, the custom capability was authored by the first vendor.

Example 4

Example 4 includes the capability management system of Example 1, including or excluding optional features. In this example, the application is stored in the memory in response to provisioning by the second vendor of a copy of the SCCD.

Example 5

Example 5 includes the capability management system of Example 1, including or excluding optional features. In this example, the processor generates the SCCD in response to a custom capability description (CCD) received by the processor.

Example 6

Example 6 includes the capability management system of Example 1, including or excluding optional features. In this example, an attempt to match the authorization listing of the SCCD occurs in user device during an installation of the application. Optionally, in the system of Example 6, the user device provides the SCCD for matching.

Example 7

Example 7 is a method for capability management. The example system for capability management includes sending a signed custom capability description (SCCD) received from a first vendor to a memory for storage. The example system for capability management further includes sending an application received from a second vendor to 801-4012222 the memory for storage in the memory in response to the application requesting a custom capability. The application can then be loaded, with or without the SCCD, and it can be determined if the application request is authorized. The example system for capability management further includes wherein the application can be modified to allow access to a previously inaccessible custom capability in response to the application matching the authorization listing of the SCCD.

Example 8

Example 8 includes the capability management method of Example 7, including or excluding optional features. In this example, the custom capability is accessible by the application in response to installation of the application on the user device subsequent to the application matching the authorization listing of the SCCD.

Example 9

Example 9 includes the capability management method of Example 7, including or excluding optional features. In this example, the custom capability was authored by the first vendor. Depending on the implementation and the application and the capability in question, the first vendor and the second vendor can be the same entity.

Example 10

Example 10 includes the capability management method of Example 7, including or excluding optional features. In this example, the application is stored in the memory in response to provisioning by the second vendor of a copy of the SCCD.

Example 11

Example 11 includes the capability management method of Example 7, including or excluding optional features. In this example, the processor generates the SCCD in response to a custom capability description (CCD) received by the processor.

Example 12

Example 12 includes the capability management method of Example 7, including or excluding optional features. In this example, an attempt to match the authorization listing of the SCCD occurs in user device during an installation of the application. Optionally, in the method of Example 12, the user device provides the SCCD for matching.

Example 13

Example 13 is a tangible, non-transitory, computer-readable medium for capability management. In this example, the computer readable-medium includes instructions that, in response to an execution by a processor send a signed custom capability description (SCCD) received from a first vendor to a memory for storage. In this example, the computer readable-medium includes instructions that, in response to an execution by a processor send an application received from a second vendor to the memory for storage in the memory in response to the application requesting a custom capability. The application can then be loaded, with or without the SCCD, and it can be determined if the application request is authorized. In this example, the application can be modified to allow access to a previously inaccessible custom capability in response to the application matching the authorization listing of the SCCD.

Example 14

Example 14 includes the computer-readable medium for capability management of Example 13, including or excluding optional features. In this example, the custom capability is accessible by the application in response to installation of the application on the user device subsequent to the application matching the authorization listing of the SCCD.

Example 15

Example 15 includes the computer-readable medium for capability management of Example 13, including or excluding optional features. In this example, the custom capability was authored by the first vendor.

Example 16

Example 16 includes the computer-readable medium for capability management of Example 13, including or excluding optional features. In this example, the application is stored in the memory in response to provisioning by the second vendor of a copy of the SCCD.

Example 17

Example 17 includes the computer-readable medium for capability management of Example 13, including or excluding optional features. In this example, the processor generates the SCCD in response to a custom capability description (CCD) received by the processor.

Example 18

Example 18 includes the computer-readable medium for capability management of Example 13, including or excluding optional features. In this example, an attempt to match the authorization listing of the SCCD occurs in user device during an installation of the application.

What is claimed is:

1. A method for capability access management, comprising:
   generating a signed custom capability description (SCCD) together with a signature in response to a custom capability description (CCD) received by a processor, the signature comprising a public key for a codesigning of a first vendor certificate in plaintext in the SCCD in a file of an application;
   sending the SCCD received from a first device for a first vendor to a memory for storage;
   sending the application received from a second device for a second vendor to the memory for storage; and
   attempting to match the application to an authorization listing of the SCCD, wherein at least one of the application or an application state is modified to allow access to a previously inaccessible custom capability in response to the application requesting a custom capability and matching to the authorization listing of the SCCD.

2. The method of claim 1, wherein the custom capability is accessible by the application in response to installation of the application on a user device subsequent to the application matching the authorization listing of the SCCD.

3. The method of claim 1, wherein the custom capability was authored by the first vendor.

4. The method of claim 1, wherein the application is stored in the memory in response to provisioning by the second device for the second vendor of a copy of the SCCD.

5. The method of claim 1, wherein an attempt to match the authorization listing of the SCCD occurs in a user device during an installation of the application.

6. The method of claim 5, wherein the user device provides the SCCD for matching.

7. One or more computer-readable storage devices comprising instructions that, in response to an execution by a processor:
   generate a signed custom capability description (SCCD) together with a signature in response to a custom capability description (CCD) received by the processor, the signature comprising a public key for a codesigning of a first vendor certificate in plaintext in the SCCD in a file of an application;
   send the SCCD received from a first device for a first vendor to a memory for storage;
   send the application received from a second device for a second vendor to the memory for storage; and
   attempt to match the application to an authorization listing of the SCCD, wherein at least one of the application or an application state is modified to allow access to a previously inaccessible custom capability in response to the application requesting a custom capability and matching to the authorization listing of the SCCD.

8. The one or more computer-readable storage devices of claim 7, wherein the custom capability is accessible by the application in response to installation of the application on a user device subsequent to the application matching the authorization listing of the SCCD.

9. The one or more computer-readable storage devices of claim 7, wherein the custom capability was authored by the first vendor.

10. The one or more computer-readable storage devices of claim 7, wherein the application is stored in the memory in response to provisioning by the second device for the second vendor of a copy of the SCCD.

11. The one or more computer-readable storage devices of claim 7, wherein an attempt to match the authorization listing of the SCCD occurs in a user device during an installation of the application.

12. A system for capability access management, comprising:
    a processor; and
    a memory comprising instructions, that when executed on the processor, cause the processor to:
      generate a signed custom capability description (SCCD) together with a signature in response to a custom capability description (CCD) received by the processor, the signature comprising a public key for a codesigning of a first vendor certificate in plaintext in the SCCD in a file of an application;
      send the SCCD received from a first device for a first vendor to the memory for storage and to send the application received from a second device for a second vendor to the memory for storage; and
      attempt to match the application to an authorization listing of the SCCD, wherein at least one of the application or an application state is modified to allow access to a previously inaccessible custom capability in response to the application requesting a custom capability and matching to the authorization listing of the SCCD.

13. The system of claim 12, wherein the custom capability is accessible by the application in response to installation of the application on a user device subsequent to the application matching the authorization listing of the SCCD.

14. The system of claim 12, wherein the custom capability was authored by the first vendor.

15. The system of claim 12, wherein the application is stored in the memory in response to provisioning by the second device for the second vendor of a copy of the SCCD.

16. The system of claim 12, wherein an attempt to match the authorization listing of the SCCD occurs in a user device during an attempt to access a feature of the application.

17. The system of claim 16, wherein the user device provides the SCCD for matching.

18. The system of claim 12, wherein the SCCD comprises a description of the custom capability, the description of the custom capability comprising a name, an authorization listing of authorized users, and metadata about the capability.

* * * * *